(12) United States Patent
Hotta et al.

(10) Patent No.: US 7,587,998 B2
(45) Date of Patent: Sep. 15, 2009

(54) POWER PLANT AND FUEL SUPPLY METHOD THEREFOR

(75) Inventors: Isamu Hotta, Kanagawa (JP); Yutaro Minami, Kanagawa (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 0 days.

(21) Appl. No.: 12/057,548

(22) Filed: Mar. 28, 2008

(65) Prior Publication Data

US 2008/0257301 A1    Oct. 23, 2008

(30) Foreign Application Priority Data

Apr. 20, 2007    (JP)    ............... 2007-111129

(51) Int. Cl.
*F02B 43/08* (2006.01)
*F02G 5/00* (2006.01)
(52) U.S. Cl. .......................... 123/3; 123/557
(58) Field of Classification Search ............... 123/2, 123/3, 557
See application file for complete search history.

(56) References Cited

U.S. PATENT DOCUMENTS 5,515,814 A * 5/1996 Cooke .................. 123/3
6,318,306 B1 * 11/2001 Komatsu .................. 123/3

FOREIGN PATENT DOCUMENTS

JP    2005-147124    6/2005

* cited by examiner

*Primary Examiner*—Noah Kamen
(74) *Attorney, Agent, or Firm*—Drinker Biddle & Reath LLP

(57) ABSTRACT

A power plant, including an internal combustion engine, a fuel conversion device that coverts a fuel to be supplied to the internal combustion engine from a before-conversion fuel to an after-conversion fuel, a first fuel supply device that supplies the fuel conversion device with the before-conversion fuel, a second fuel supply device that supplies the internal combustion engine with the after-conversion fuel, the after-conversion fuel being the fuel that has been converted by the fuel conversion device, and a controller that is communicated with the internal combustion engine, the fuel conversion device, the first fuel supply device and the second fuel supply device. The controller is configured to supply the fuel conversion device with the before-conversion fuel by operating the first fuel supply device, control the temperature of the fuel conversion device in a first temperature range to evaporate the before-conversion fuel to produce a first after-conversion fuel, control the temperature of the fuel conversion device in a second temperature range to reform the before-conversion fuel to produce a second after-conversion fuel, and supply the internal combustion engine with the after-conversion fuel by operating the second fuel supply device.

25 Claims, 10 Drawing Sheets

MAIN COMBUSTION CHAMBER

AUXILIARY COMBUSTION CHAMBER

US 7,587,998 B2

POWER PLANT AND FUEL SUPPLY METHOD THEREFOR

CROSS-REFERENCE TO RELATED APPLICATIONS

This application claims priority under 35 U.S.C. § 119 to Japanese Patent Application No. 2007-111129, filed on Apr. 20, 2007, which is incorporated by reference herein in the entirety.

BACKGROUND OF THE INVENTION

1. Field of the Invention

The present invention relates to a fuel supply device that feeds an internal combustion engine with a fuel, and more particularly to a fuel supply device for an internal combustion engine that is equipped with a fuel conversion device.

2. Description of Related Art

In the related art, there has been proposed an internal combustion engine in which an in-tank fuel (such as cyclohexane or the like, that is a before-convention fuel led into a fuel tank from the outside) is reformed into hydrogen and a high-octane fuel (e.g. having a benzene nucleus) by a dehydrogen-reforming reaction. Such hydrogen and high-octane fuel are fed to the engine to combust in the engine, such that a low load fuel consumption performance in a lean-burn operation using the hydrogen is improved, and a high load output performance in a high compression ratio with the high octane fuel is also improved.

In a fuel supply device to which the above-mentioned fuel reforming system is applied, when the original fuel (viz., in-tank fuel) before being reformed is composed of only naphthenic hydrocarbons such as cyclohexane or the like, all of the original fuel can be reformed into a reformed fuel and fed to the engine. However, when the original fuel is a fuel (for example, gasoline) that is available on the market, it is impossible to reform all of the fuel components, and thus, it is necessary to also feed the engine with the original fuel for combustion in the engine. For this reason, the fuel supply device to which the above-mentioned fuel reforming system is applied is effective in case of using a fuel (such as gasoline or the like) that has a relatively low boiling point as the original fuel. However, in case of using a fuel (for example, light oil or the like) that has a relatively high boiling point as the original fuel, undesired fuel flow on the walls of intake ports and combustion chambers tends to occur which causes the problem of increased unburnt HC (Hydrocarbons) and PM (Particle Materials).

BRIEF SUMMARY OF THE INVENTION

In an embodiment, the invention provides a power plant, including an internal combustion engine, a fuel conversion device that coverts a fuel to be supplied to the internal combustion engine from a before-conversion fuel to an after-conversion fuel, a first fuel supply device that supplies the fuel conversion device with the before-conversion fuel, a second fuel supply device that supplies the internal combustion engine with the after-conversion fuel, the after-conversion fuel being the fuel that has been converted by the fuel conversion device, and a controller that is communicated with the internal combustion engine, the fuel conversion device, the first fuel supply device and the second fuel supply device. The controller is configured to supply the fuel conversion device with the before-conversion fuel by operating the first fuel supply device, control the temperature of the fuel conversion device in a first temperature range to evaporate the before-conversion fuel to produce a first after-conversion fuel, control the temperature of the fuel conversion device in a second temperature range to reform the before-conversion fuel to produce a second after-conversion fuel, and supply the internal combustion engine with the after-conversion fuel by operating the second fuel supply device.

In another embodiment, the invention provides a method of controlling a power plant, including exchanging heat between a fuel conversion device and exhaust heat of an internal combustion engine, supplying a before-conversion fuel to the fuel conversion device, controlling the temperature of the fuel conversion device in a first temperature range to evaporate the before-conversion fuel to produce a first after-conversion fuel, controlling the temperature of the fuel conversion device in a second temperature range to reform the before-conversion fuel to produce a second after-conversion fuel, and supplying the internal combustion engine with the after-conversion fuel.

According to the present invention, by using only one fuel conversion device, both an evaporated fuel and a reformed fuel are produced, and the fuel supplied from the outside is fed to the internal combustion engine as the evaporated fuel, and thus, even if the fuel supplied from the outside is a fuel such as light oil or the like that has a relatively high boiling point, the undesired fuel flow on walls is suppressed.

BRIEF DESCRIPTION OF THE DRAWINGS

The accompanying drawings, which are incorporated herein and constitute part of this specification, illustrate preferred embodiments of the invention, and together with the general description given above and the detailed description given below, serve to explain features of the invention.

DETAILED DESCRIPTION OF THE PREFERRED EMBODIMENTS

In the following, embodiments of the present invention will be described with reference to the drawings.

Figure 1:
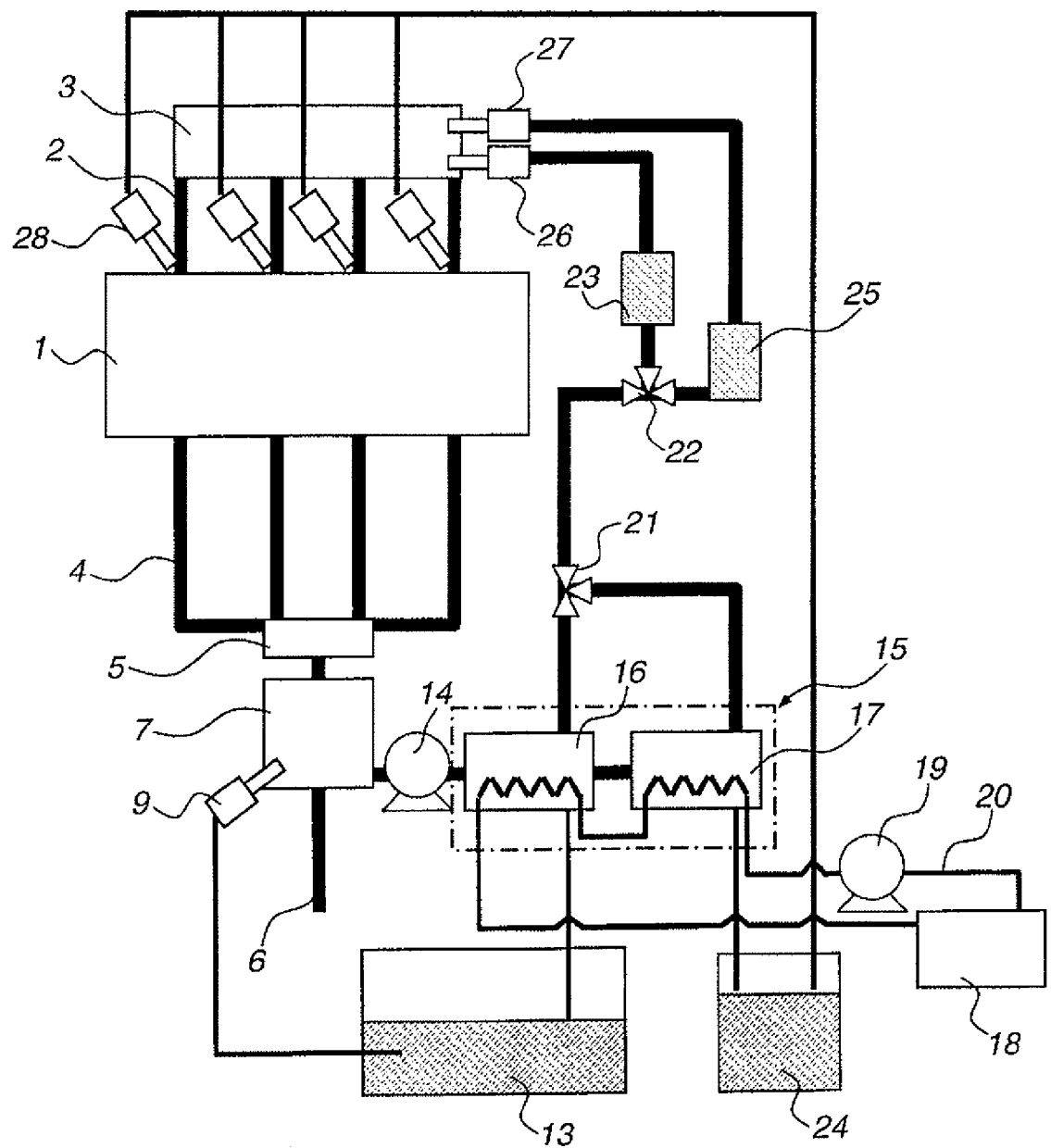
FIG. 1 is a block diagram of a first embodiment of the present invention.

FIG. 1 is a block diagram showing a first embodiment of a power plant of the present invention. In FIG. 1, an engine 1 is connected to an intake collector 3 through an intake manifold 2. An exhaust purifying catalyst 5 is connected to a branch joined portion of an exhaust manifold 4 of engine 1. Around an exhaust pipe 6 that extends downward from the catalyst, there is mounted a fuel conversion device 7 that converts a supplied liquid fuel to an evaporated fuel and a reformed fuel by practically using waste heat of the internal combustion engine as energy, such as waste heat from exhaust pipe 6.

Figure 2:
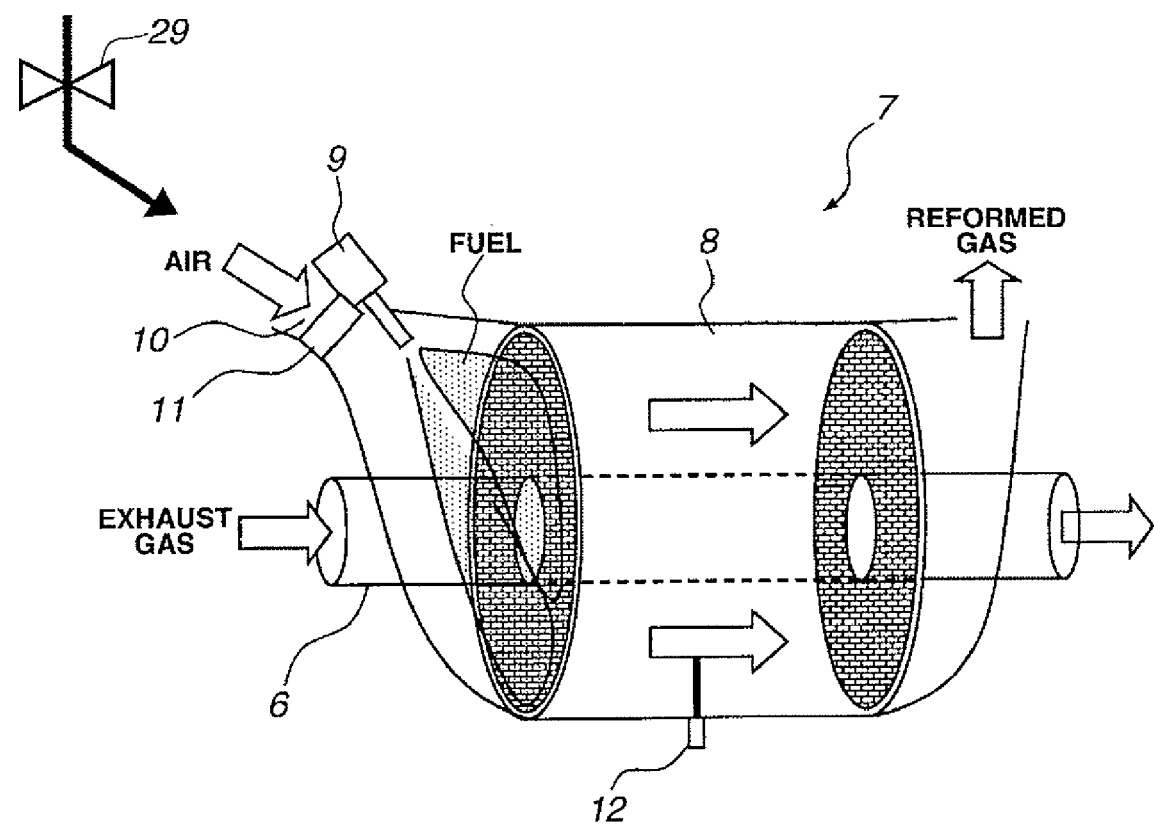
FIG. 2 is a detailed view of a fuel conversion device.

Details of fuel conversion device 7 are shown in FIG. 2. In fuel conversion device 7, there is formed a cylindrical space that surrounds exhaust pipe 6, and in the space, there is arranged a reforming catalyst 8 that includes a honeycomb cordierite bed coated with platinum catalyst. At an inlet side of reforming catalyst 8, there is provided an air intake opening 10 through which air can enter device 7. The amount of air led into device 7 can be controlled by an air induction valve 29 (viz., air amount, or gas amount adjusting device), and the air amount led into device 7 can be measured by an air flow meter 11. Furthermore, to fuel conversion device 7, there is provided a thermocouple 12 as a temperature sensor that, for detecting the temperature of fuel conversion device 7, faces reforming catalyst 8.

Fuel conversion device 7 is of a type that carries out fuel evaporation and/or fuel reforming by practically using the waste heat of engine 1. As will be understood from FIG. 5, the device 7 is able to selectively act as an evaporator device that evaporates the supplied liquid fuel and shows generally 100% fuel evaporation rate in a first temperature range, and a fuel reforming device that reforms the supplied liquid fuel by a dehydrogen-reforming reaction at a temperature higher than the first temperature range and shows generally 100% fuel reforming rate in a second temperature range. As will be understood from FIG. 7, switching the temperature ranges is carried out by varying a fuel supply amount per unit time, controlling an air/fuel ratio by varying an intake air amount per unit time, or using these methods together. With such methods, the temperature control of fuel conversion device 7 is easily carried out with the work of evaporation latent heat and sensible heat of the fuel, and oxidization of the fuel caused by air introduction.

Figure 7:
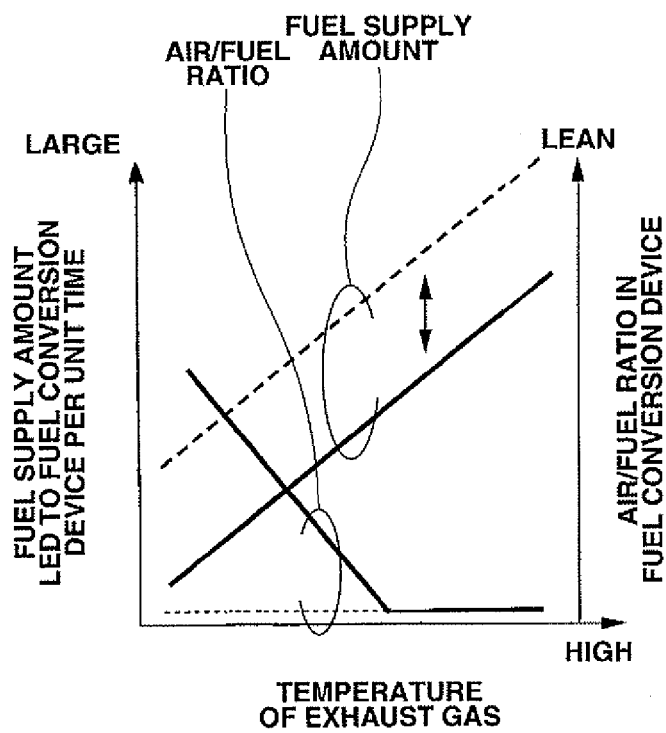
FIG. 7 is a drawing showing a fuel supply condition and an air supply condition that are provided for controlling switching of the temperature ranges of the fuel conversion device.

For example, in case of switching the range from the first temperature range to the second temperature range, a change is made from a fuel supply characteristic represented by the broken characteristic curve of FIG. 7 to a fuel supply characteristic represented by the solid characteristic curve of FIG. 7, thereby reducing the fuel supply amount and lowering a cooling effect by the fuel. Also, in a range where the exhaust gas temperature is low, the air amount is increased to make the air/fuel ratio leaner, so that the oxidation reaction is activated and thus the temperature is increased. That is, in case of reforming the before-conversion fuel by controlling the temperature of fuel conversion device 7 in the second temperature range, in the range where the exhaust gas temperature is low, the air amount fed to the fuel conversion device per unit time is increased as the waste heat of the internal combustion engine decreases. While, in case of switching the range from the second temperature range to the first temperature range, a change is made from the fuel supply characteristic represented by the solid characteristic curve to the fuel supply characteristic represented by the broken characteristic curve thereby increasing the fuel supply amount activating the cooling effect by the fuel. Furthermore, by stopping the air induction, the air/fuel ratio is made extremely rich, so that the oxidation reaction is lowered and thus the temperature is reduced.

In a case where it is desired to maintain the temperature range after the temperature reaches the desired temperature range, the fuel amount and air amount are varied or controlled in accordance with the exhaust gas temperature by practically using the fuel supply characteristics represented by the solid and broken characteristic curves of FIG. 7, and an air/fuel ratio characteristic of the engine. For example, in case of keeping the temperature in the first temperature range, the fuel supply amount is varied or controlled in accordance with the exhaust gas temperature by practically using the fuel supply characteristic represented by the broken characteristic curve of FIG. 7. The amount of the before-conversion fuel led to the fuel conversion device per unit time is increased as the waste heat of the internal combustion engine increases. In case of keeping the temperature in the second temperature range, tile fuel supply amount and air amount are varied or controlled in accordance with the exhaust gas temperature by practically using the fuel supply characteristic represented by the solid characteristic curve of FIG. 7, and the air/fuel ratio characteristic of the engine. With this, lowering of the exhaust gas temperature is compensated by the oxidation reaction, so that the higher second temperature range is easily maintained. The amount of the before-conversion fuel led to the fuel conversion device per unit time is increased as the waste heat of the internal combustion engine increases, and the amount of the before-conversion fuel per unit time when the temperature of the fuel conversion device is controlled in the second temperature range (for reforming the before-conversion fuel) is small as compared with the amount of the before-conversion fuel per unit time when the temperature of the fuel conversion device is control led in the first temperature range (for evaporating the before-conversion fuel).

A liquid fuel from a fuel tank 13 (into which the fuel is led from the outside) is fed to a fuel injection valve 9 of fuel conversion device 7. In the embodiment, a liquid fuel (a low-octane fuel, such as light oil or the like) is used, which has a boiling point higher than that of gasoline and has an octane number lower than that of gasoline. The liquid fuel led to fuel conversion device 7 is evaporated and thus converted to an evaporated fuel with the work of the exhaust heat in the first temperature range of FIG. 5 where reforming catalyst 8 is not activated. While, in the second temperature range where reforming catalyst 8 is activated, the liquid fuel is subjected to various reforming reactions described supra, such as dehydrogen-reforming reaction and the like, due to the work of the exhaust heat, so that light oil representative components are reformed into hydrogen gas, and high octane fuel that has a relatively low boiling point. The evaporated fuel or the reformed fuel is the after-conversion fuel.

Dehydrogen-reforming reaction:
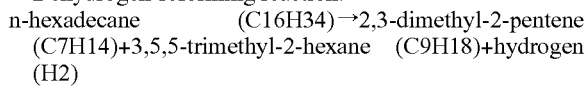
n-hexadecane (C16H34)→2,3-dimethyl-2-pentene (C7H14)+3,5,5-trimethyl-2-hexane (C9H18)+hydrogen (H2)

(Dehydrogen+Cyclization) reforming reaction:
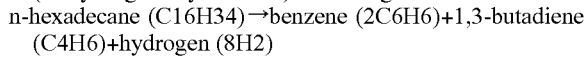
n-hexadecane (C16H34)→benzene (2C6H6)+1,3-butadiene (C4H6)+hydrogen (8H2)

(Dehydrogen+Decomposition) reforming reaction:
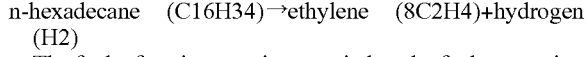
n-hexadecane (C16H34)→ethylene (8C2H4)+hydrogen (H2)

The fuel reforming reactions carried out by fuel conversion device 7 are not limited to the above-mentioned dehydrogen type reaction. For example, the fuel reforming may be carried out by isomerization reaction and partial oxidation reaction, which are as follows.

Isomerization-reforming reaction:
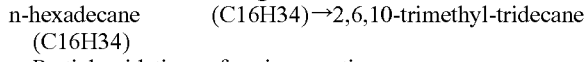
n-hexadecane (C16H34)→2,6,10-trimethyl-tridecane (C16H34)

Partial oxidation-reforming reaction:
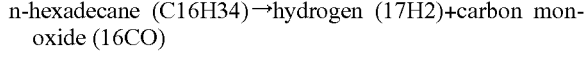
n-hexadecane (C16H34)→hydrogen (17H2)+carbon monoxide (16CO)

In case of the fuel reforming by the isomerization-reforming reaction, production of liquid reformed fuels having a much higher octane number is possible. Since the fuel reforming by the partial oxidation-reforming reaction is not easily influenced by fuel components, production of a much greater quantity of reformed fuel is possible.

The evaporated fuel and reformed gaseous fuel produced by fuel conversion device 7 are led into a condenser 15 with the work of a gas compressor 14. Condenser 15 is of a multi-stage type including a first condenser section 16 into which the fuel from fuel conversion device 7 is led and a second condenser section 17 that is connected with first condenser section 16 in tandem. A cooling water circulation passage 20 is connected to first and second condenser sections 16 and 17 through which cooling water from a radiator 18 is circularly led by a water pump 19 to the two condenser sections in a direction from second condenser section 17 to first condenser section 16. With this cooling water circular passage, first condenser section 16 is able to carry out a liquefaction-separation to produce a fuel that has a relatively low volatility, and second condenser section 17 is able to carry out a liquefaction-separation to produce a fuel that has a relatively high volatility.

Figure 3:
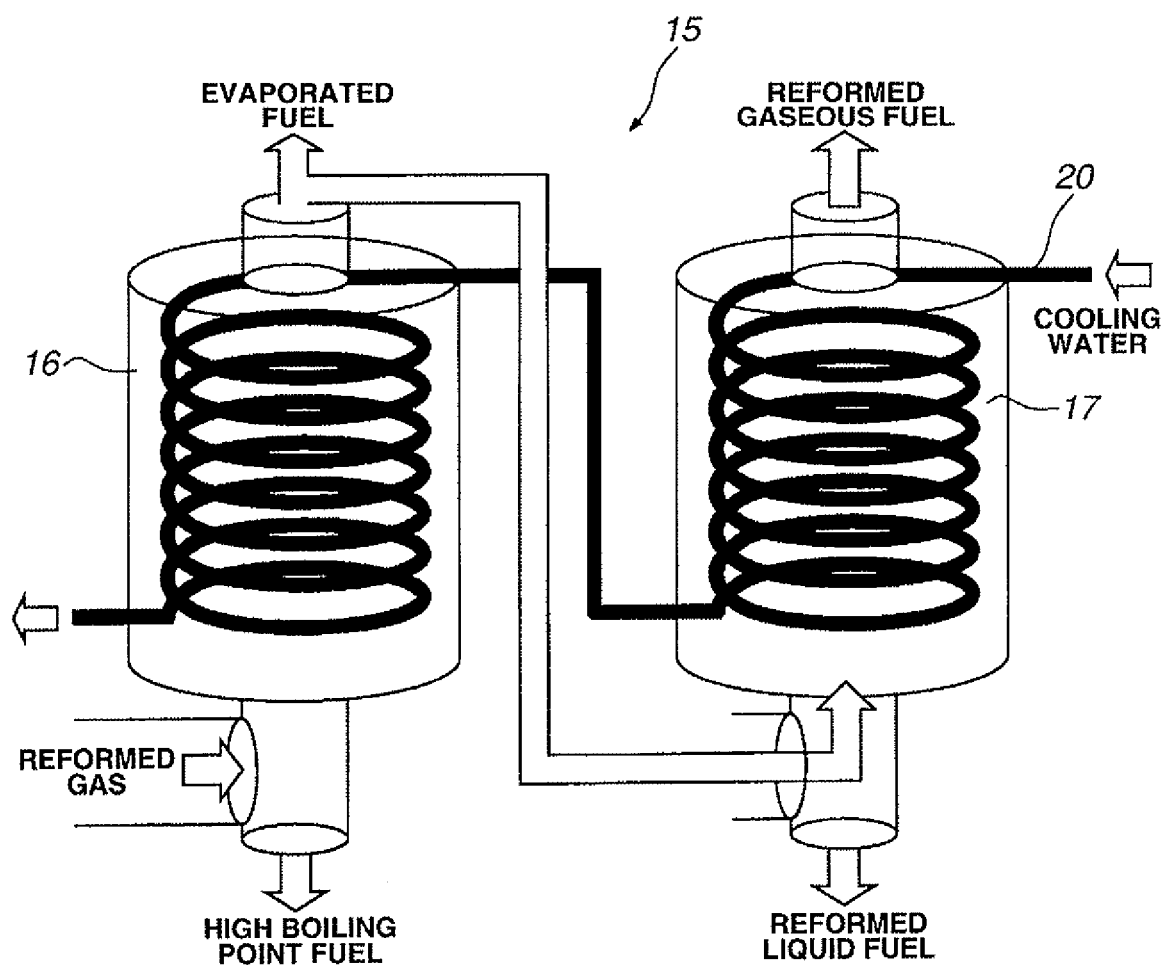
FIG. 3 is a detailed view of a condenser.

The interior of condenser 15 is shown in FIG. 3. As shown, in first and second condenser sections 16 and 17, there is arranged the cooling water circulation passage 20. When the evaporated fuel is led into first condenser section 16, the evaporated fuel is cooled and thus separated into components having a relatively low boiling point and components having a relatively high boiling point, and then the relatively high boiling point components are liquefied and returned to fuel tank 13 through a lower outlet port, and the relatively low boiling point components are led through an upper outlet port and three-way valves 21 and 22 to an evaporated fuel tank 23, and reserved in the tank 23 as an evaporated fuel. While, when the reformed gaseous fuel is led into first condenser section 16, unreformed fuel components with a higher boiling point that may be contained in the reformed gaseous fuel are subjected to a liquefaction-separation in first condenser section 16, and when thereafter the reformed gaseous fuel is cooled by second condenser section 17, the reformed gaseous fuel is separated into a high octane reformed liquid fuel that has a boiling point lower than that of the fuel in fuel tank 13, and a reformed gaseous fuel that is rich in hydrogen. The reformed liquid fuel is led through a lower outlet port to a reformed liquid fuel tank 24, and reserved in the tank 24, and the reformed gaseous fuel is led through an upper outlet port and three-way valves 21 and 22 to a reformed gaseous fuel tank 25, and reserved in the tank 25.

As described above, in case of producing an evaporated fuel, only first condenser section 16 of condenser 15 is used, so that a low octane evaporated fuel that contains components with a relatively low boiling point is produced. While, in case of producing a reformed fuel, both first and second condenser sections 16 and 17 of condenser 15 are used, so that unreformed fuel components are separated, and thus, a high octane reformed liquid fuel and a reformed gaseous fuel which are high in purity are produced. One case wherein only first condenser section 16 is used (viz., the case of producing the evaporated fuel) and the other case wherein both first and second condenser sections 16 and 17 are used (viz., the case of producing the reformed fuel) are selectively changed by a switching control of two three-way valves 21 and 22.

The evaporated fuel in evaporated fuel tank 23 and the reformed gaseous fuel in reformed gaseous fuel tank 25 are injected into intake collector 3 by respective injection valves 26 and 27 (a.k.a. a second fuel supply device), and after mixing with air in intake collector 3, the injected fuel is sucked into each cylinder through intake manifold 2. The reformed liquid fuel in reformed liquid fuel tank 24 is injected from four injection valves 28 mounted to intake ports 36 which are shown in FIG. 4 and connected to intake manifold 2, and the reformed liquid fuel thus injected is mixed with air that is being led into each cylinder of engine 1 from intake collector 3 through intake manifold 2, and finally sucked into each cylinder.

Figure 4:
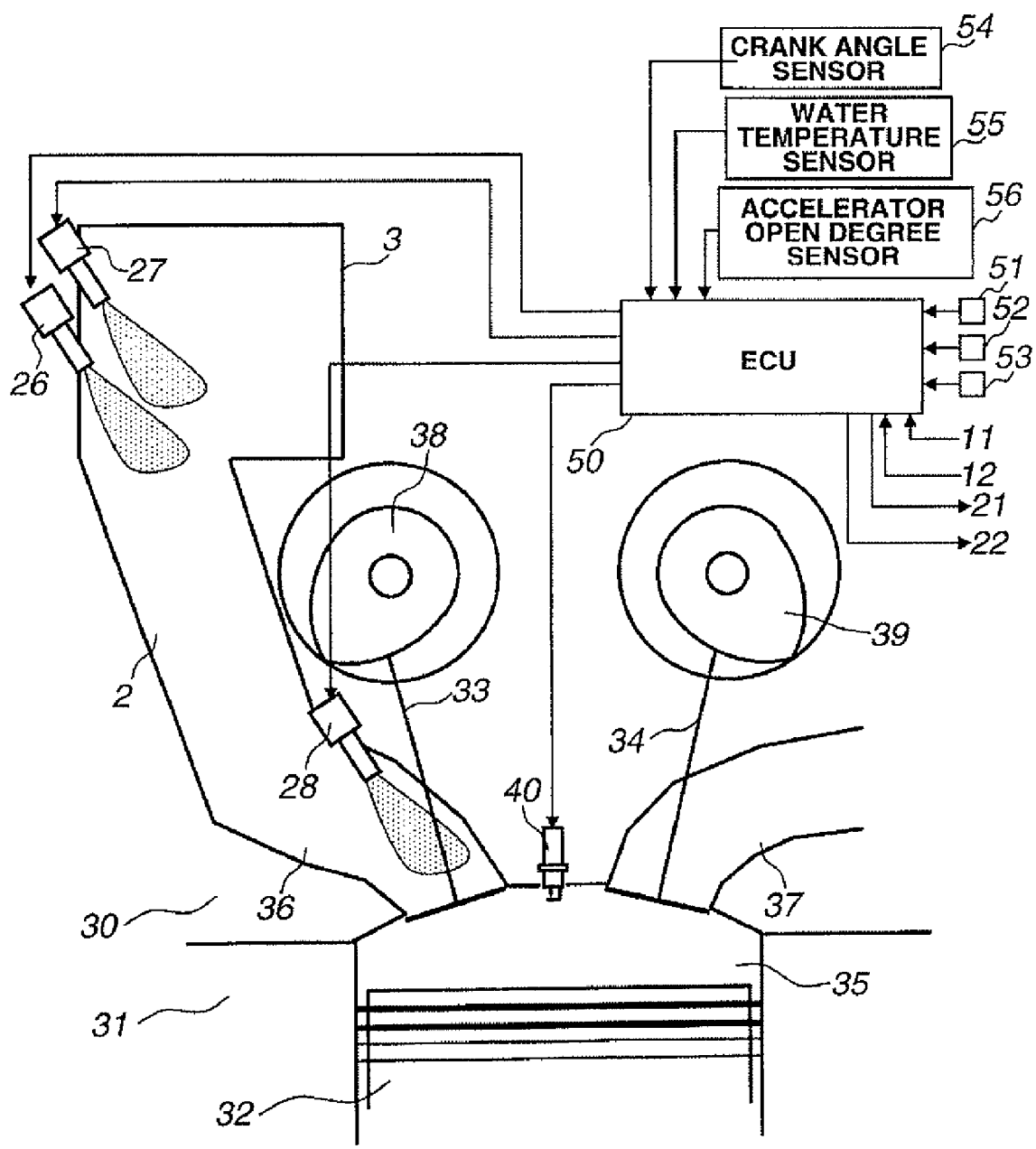
FIG. 4 is a detailed view of an engine of the first embodiment.

The construction of engine 1 is shown in FIG. 4.

In each cylinder of engine 1, a combustion chamber 35 is defined by a cylinder head 30, a cylinder block 31, a piston 32, an intake valve 33 and an exhaust valve 34. Intake valve 33 functions to open and close a passage between intake port 36 connected to intake manifold 2 and combustion chamber 35. Injection valve 28 injects the reformed liquid fuel and is mounted to intake port 36. Exhaust valve 34 functions to open and close a passage between an exhaust port 37 connected to exhaust manifold 4 and combustion chamber 35. Intake valve 33 and exhaust valve 34 are periodically reciprocated between a full open position and a full close position by an intake valve cam 38 and an exhaust valve cam 39, respectively. An ignition plug 40 that ignites the air/fuel mixture in combustion chamber 35 is mounted to cylinder head 30.

Into combustion chamber 35 of engine 1 having the above-mentioned construction, intake air is sucked from an air cleaner through intake collector 3, intake manifold 2, intake port 36 and intake valve 33. During this process, an evaporated fuel from injection valve 26 and a reformed gaseous fuel from injection valve 27, respectively, are injected into intake collector 3, in accordance with an engine operation condition. Furthermore, a reformed liquid fuel from injection valve 28 is injected into intake port 36.

The air/fuel mixture prepared in combustion chamber 35 in the above-mentioned manner is ignited by ignition plug 40 during the second half of the compression stroke of piston 32, or during the first half of the expansion stroke of the same, so that the mixture is burnt, thereby producing combustion pressure by which piston 32 is reciprocated.

A fuel injection timing and an injection period of each injection valve 9, 26, 27 or 28 and an ignition timing of ignition plug 40 are adjusted by instruction signals that are outputted from an engine control unit (referred to as ECU hereinafter) 50 that includes a microcomputer. The degree that air induction valve 29 is opened, through which air is led to fuel conversion device 7, and the switching manner of three-way valves 21 and 22, are controlled by ECU 50. Furthermore, switching between the fuel evaporation process by fuel conversion device 7 and the fuel reforming process by the same is controlled by ECU 50. Now, it is to be noted that ECU 50 has a function of switching the temperature.

Various information signals for carrying out the above-mentioned control are fed to ECU 50, including a signal from air flow meter 11 that detects the air amount led to reforming catalyst 8, a signal from thermocouple 12 that detects a temperature of reforming catalyst 8, a signal from a pressure sensor 51 that detects a fuel pressure in evaporated fuel tank 23, a signal from a level sensor 52 that detects a liquid level of reformed liquid fuel tank 24, a signal from a pressure sensor 53 that detects a pressure in reformed gaseous fuel tank 25, a signal from a crank angle sensor 54 that detects a crank angle of engine 1 and rotation speed of the same, a signal from a water temperature sensor 55 that detects the temperature of engine cooling water, and a signal from an accelerator open degree sensor 56 that detects an angular degree (an accelerator open degree) by which an accelerator pedal equipped by the vehicle is depressed.

Figure 6:
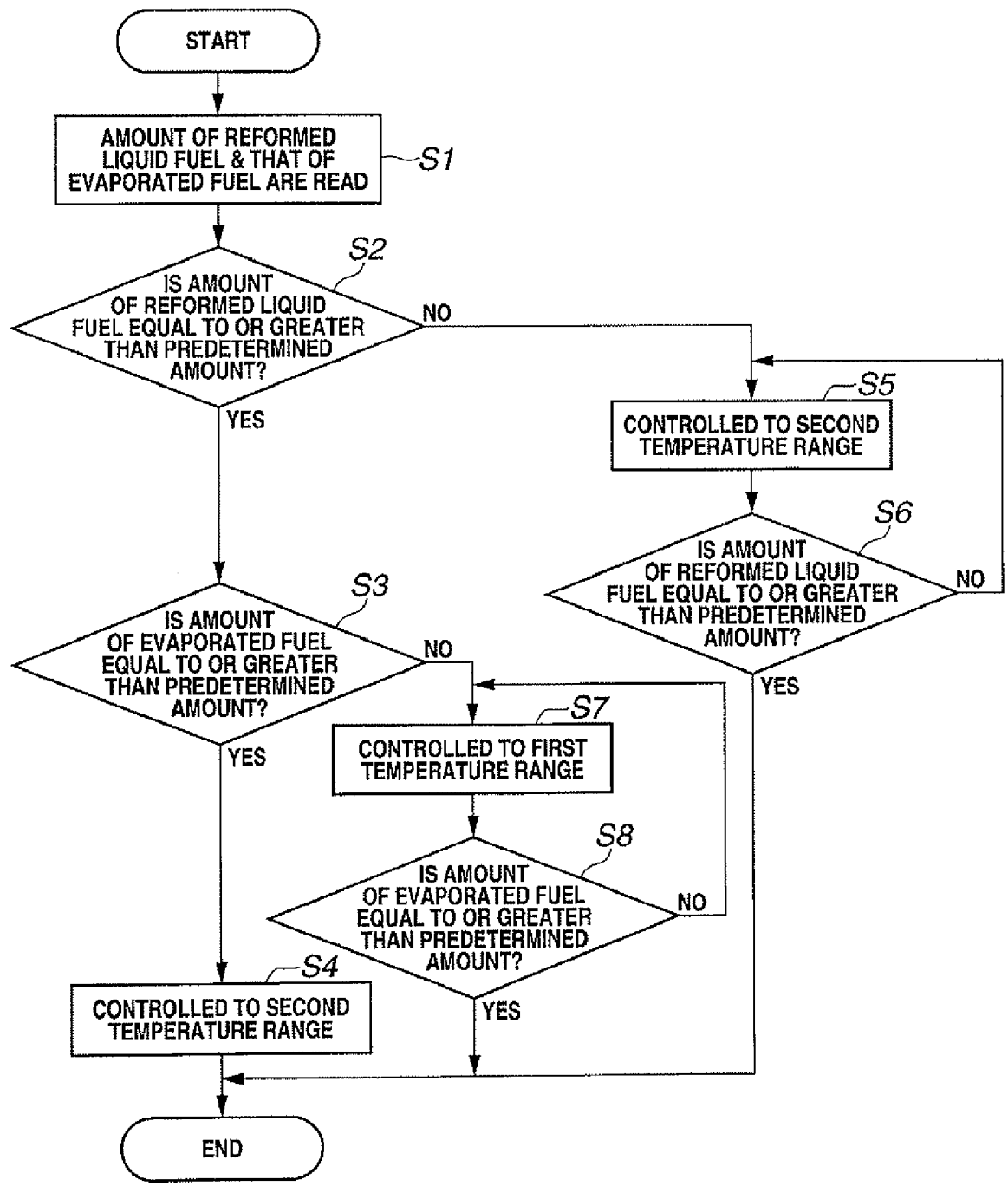
FIG. 6 is a flowchart explaining operation steps of a fuel conversion control.

The switching control of the fuel conversion process of fuel conversion device 7 will be described with reference to the flowchart of FIG. 6.

At step 1 (indicated by S1 in FIG. 6, with the same convention being used for each step), the amount of the reformed liquid fuel in reformed liquid fuel tank 24 and that of the evaporated fuel in evaporated fuel tank 23 are read by processing the information signals from level sensor 52 and pressure sensor 51, respectively. The reading of the amount of the reformed liquid fuel and that of the evaporated fuel is not limited to only such level sensor and pressure sensor. That is, any method may be used as long as it estimates the amount of each fuel.

At step 2, judgment is carried out as to whether or not the amount of the reformed liquid fuel is equal to or greater than a predetermined amount. If the amount is equal to or greater than the predetermined amount, that is, if YES, the operation flow goes to step 3, while if the amount is smaller than the predetermined amount, the operation flow goes to an after-mentioned step 5.

At step 3, judgment is carried out as to whether or not the amount of the evaporated fuel is equal to or greater than a predetermined amount. If the amount is equal to or greater than the predetermined amount, the operation flow goes to step 4, while if the amount is smaller than the predetermined amount, the operation flow goes to an after-mentioned step 7.

Figure 5:
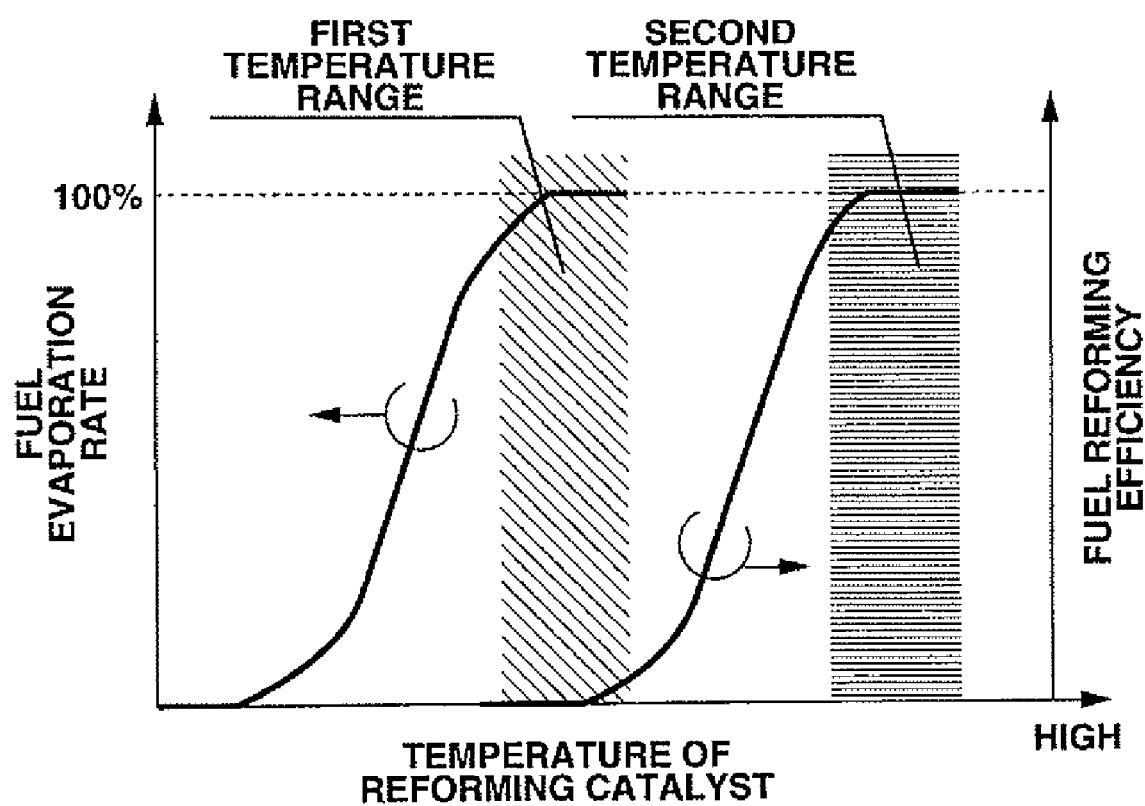
FIG. 5 is a graph showing a relationship between an evaporation characteristic, a reforming characteristic, and first and second temperature ranges.

At step 4, fuel conversion device 7 is controlled to take the second temperature range of FIG. 5.

If the operation flow goes to step 5 upon judgment NO at step 2, fuel conversion device 7 is controlled to take the second temperature range shown in FIG. 5 for carrying out the fuel reforming, and thus, a reformed liquid fuel is produced.

More specifically, by controlling three-way valves 21 and 22, a fuel passage from the upper outlet port of second condenser section 17 to reformed gaseous fuel tank 25 is opened and the upper outlet port of first condenser section 16 and the inlet port of evaporated fuel tank 23 are closed. Then, as is described hereinabove, the fuel injection amount by injection valve 9 per unit time and the air/fuel ratio in fuel conversion device 7 are suitably controlled in accordance with the exhaust gas temperature by practically using the characteristic curve drawn by solid line in FIG. 7. For example, if the temperature of reforming catalyst 8 is low, the fuel injection amount is reduced to reduce or lower the cooling effect provided by evaporation latent heat, or the air induction amount is increased to control the air/fuel ratio at a leaner side for practical usage of the oxidation combustion reaction (viz., a portion of FIG. 7 where, in the air/fuel ratio characteristic represented by the solid curve, the air/fuel ratio becomes leaner as the exhaust gas temperature lowers), or the above-mentioned measures are used together. That is, by using these measures, the temperature of reforming catalyst 8 is increased to the second temperature range. While, if the temperature of reforming catalyst 8 is high, the fuel injection amount is increased to activate the cooling effect provided by evaporation latent heat, or the air induction is stopped to control the air/fuel ratio at an extremely rich side (viz., a portion of FIG. 7 where, in the air/fuel ratio characteristic represented by the solid curve, the exhaust gas temperature is relatively high while showing the richest air/fuel ratio). That is, by using these measures, the temperature of reforming catalyst 8 is lowered to the second temperature range. When the temperature of reforming catalyst 8 in fuel conversion device 7 is controlled to the second temperature range, fuel conversion device 7 acts as a fuel reforming device thereby producing both a high octane fuel and a reformed gas containing hydrogen gas. The reformed gas thus produced is led into first condenser section 16 of condenser 15, and if the reformed gas contains unreformed components having a high boiling point, the unreformed components are subjected to a condensation-separation in first condenser section 16 and returned back to fuel tank 13. Thereafter, the reformed gas is led into second condenser section 17 and separated into a reformed liquid fuel of high octane number and a reformed gaseous fuel rich in hydrogen gas, and then the reformed liquid fuel is reserved in reformed liquid fuel tank 24 and the reformed gaseous fuel is led to reformed gaseous fuel tank 25 through three-way valves 21 and 22 and reserved in the tank 25.

At step 6, judgment is carried out as to whether or not the amount of the reformed liquid fuel is equal to or greater than the predetermined amount. If NO, the temperature of fuel conversion device 7 is controlled to the second temperature range until the amount is increased to the predetermined amount keeping production of the reformed liquid fuel. If YES at step 6, for example, the fuel injection by injection valve 9 is stopped to stop the fuel reforming process, thereby ending the fuel conversion operation of fuel conversion device 7.

If the operation flow goes to step 7 upon judgment NO at step 3, fuel conversion device 7 is controlled to take the first temperature range shown in FIG. 5 for carrying out the fuel evaporation, and thus, an evaporated fuel is produced.

More specifically, by controlling three-way valves 21 and 22, a fuel passage from the upper outlet port of first condenser section 16 to evaporated fuel tank 23 is opened, and the upper outlet port of second condenser section 17 and the inlet port of reformed gaseous fuel tank 25 are closed. Then, as is described hereinabove, the fuel injection amount by injection valve 9 per unit time is suitably controlled in accordance with the exhaust gas temperature by practically using the characteristic curve drawn by broken line in FIG. 7. For example, if the temperature of reforming catalyst 8 is low, the fuel injection amount is reduced to reduce or lower the cooling effect provided by evaporation latent heat, so that the temperature of reforming catalyst 8 is increased to the first temperature range. While, if the temperature of reforming catalyst 8 is high, the fuel injection amount is increased to activate the cooling effect provided by evaporation latent heat, so that the temperature of reforming catalyst 8 is lowered to the first temperature range. In the first temperature range, the temperature is low and thus the oxidation reaction hardly takes place. Thus, in this case, the air/fuel ratio is kept at an extremely rich side. As is described hereinabove, when fuel conversion device 7 is controlled to take the first temperature range, fuel conversion device 7 acts as an evaporator and thus fuel conversion device 7 produces an evaporated fuel. The evaporated fuel thus produced is led into first condenser section 16 of condenser 15, and components of the evaporated fuel that have a relatively high boiling point are subjected to a condensation-separation in section 16 and are returned back to fuel tank 13, and components of the evaporated fuel that have a relatively low boiling point are led into evaporated fuel tank 23 through three-way valves 21 and 22 and reserved therein as an evaporated fuel.

When the evaporated fuel is being produced by controlling fuel conversion device 7 to take the first temperature range, air may be led into the device as a dilution gas for diluting the fuel in such a manner that the ratio of air amount relative to the supplied fuel amount is a predetermined ratio. With this fuel dilution, the actual boiling point of the evaporated fuel produced by fuel conversion device 7 can be lowered because of an azeotropy effect, and thus, condensation of the evaporated fuel in evaporated fuel tank 23 and fuel piping is suppressed. In the first temperature range, the temperature of reforming catalyst 8 is low, and thus, even when fuel conversion device 7 is supplied with air, the oxidation reaction does not take place, and thus, the temperature in fuel conversion device 7 is not excessively increased.

If desired, in place of air, EGR gas may be used as the dilution gas.

At step 8, judgment is carried out as to whether or not the amount of the evaporated fuel is equal to or greater than a predetermined amount. If NO, the temperature of fuel conversion device 7 is controlled to the first temperature range until the amount is increased to the predetermined amount keeping production of the evaporated fuel. If YES at step 8, for example, the fuel injection by injection valve 9 is closed to stop the fuel evaporation process thereby ending the fuel conversion operation of fuel conversion device 7.

In the following, the fuel supply control of the embodiment will be described.

Figure 8:
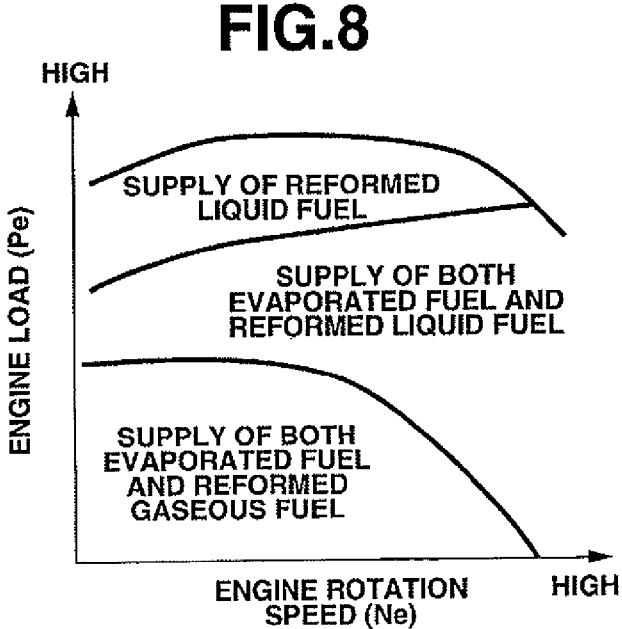
FIG. 8 is a fuel supply control map used for operation of the first embodiment.
Figure 9:
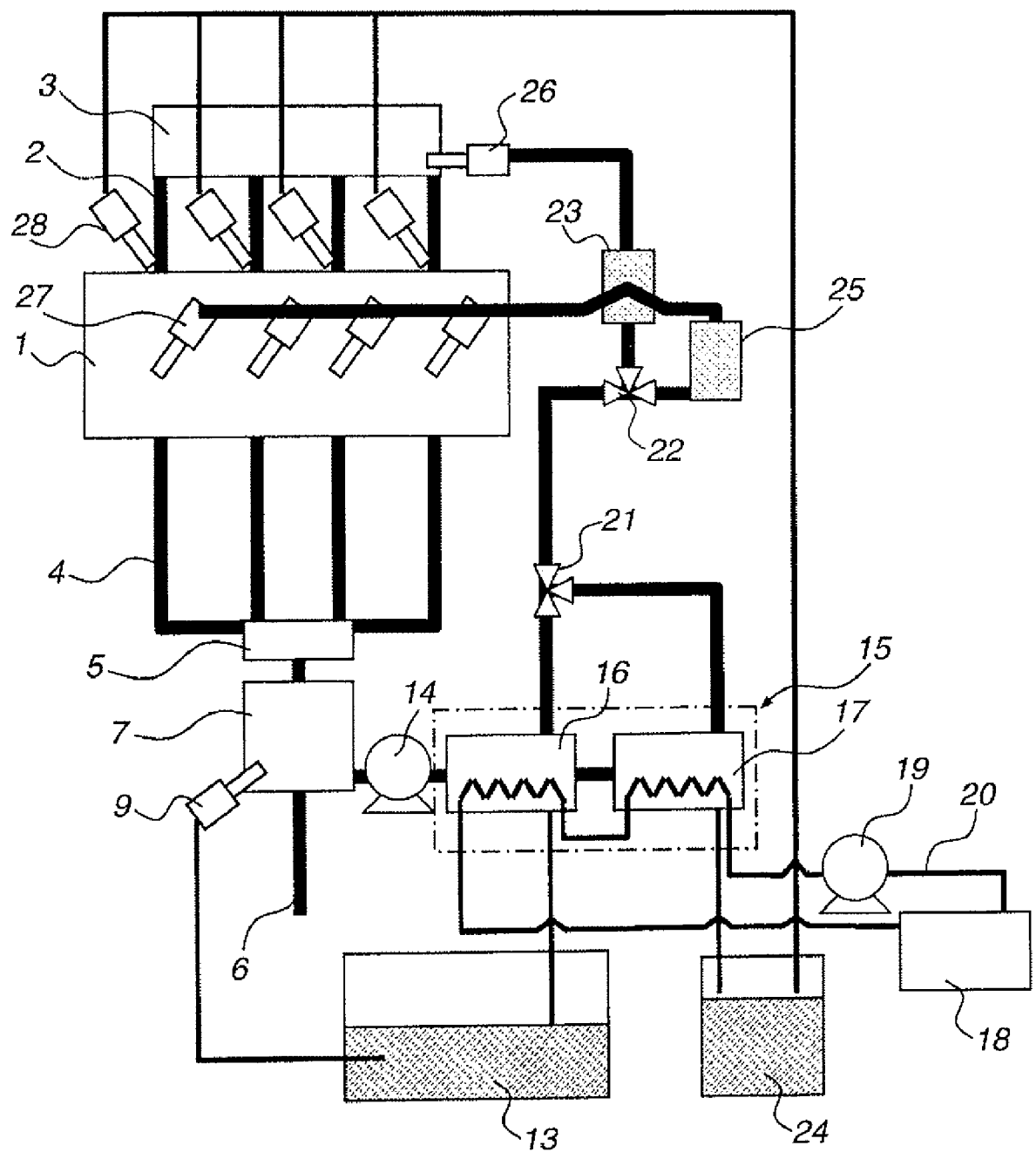
FIG. 9 is a block diagram of a second embodiment of the present invention.
Figure 10:
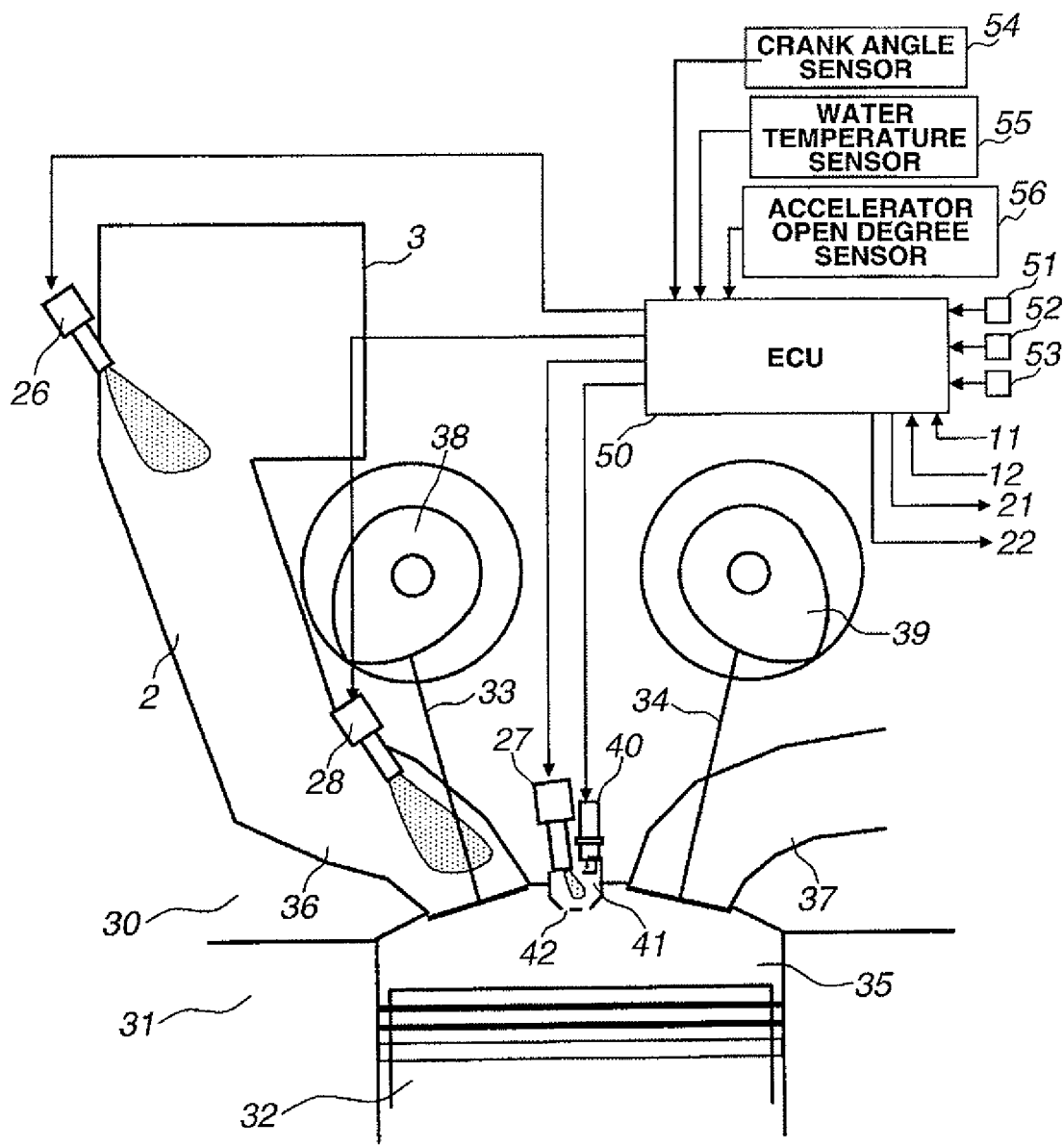
FIG. 10 is a detailed view of an engine of the second embodiment.

In ECU 50, an engine rotation speed Ne detected by crank angle sensor 54 and an accelerator open degree detected by accelerator open degree sensor 56 are read, a feeding ratio between the amount of evaporated fuel, the amount of reformed gaseous fuel and the amount of reformed liquid fuel is determined based on engine rotation speed Ne and an engine load (indicated by cylinder interior effective pressure Pe) with reference to a fuel supply control map of FIG. 8 that has been previously stored in a memory, and in accordance with the determined feeding ratio, injection valves 26, 27 and 28 are controlled to inject controlled amounts of respective fuels to engine 1.

As is described hereinabove, in the embodiment, under a low load operation condition of the engine, the evaporated fuel and the reformed gaseous fuel are fed to the engine, and under a high load condition of the engine, the reformed liquid fuel is fed to the engine. With such fuel feeding measures, usage of low octane fuel in a low load operation of the engine brings about a high fuel consumption performance (viz., enhanced fuel economy) and usage of high octane fuel in a high load operation of the engine brings about a high torque output performance caused by high compression ratio and high volumetric efficiency. Furthermore, a low octane fuel with a high boiling point is fed to engine 1 after being changed to an evaporated fuel, and thus, even when a fuel having a high boiling point, like light oil or the like, is used, undesirable fuel flow on walls of the intake port and combustion chamber is suppressed or at least minimized. Furthermore, in the embodiment, condenser 15 is provided at a downstream position of fuel conversion device 7 for separating a high volatile gaseous fuel and a low volatile liquid fuel, and thus, undesired fuel condensation in the fuel piping from fuel conversion device 7 to the gaseous fuel injection valves 26 and 27, and that in fuel tanks 23 and 25, are suppressed.

Furthermore, during production of the evaporated fuel, first condenser section 16 condensates the same and thus separates relatively high boiling point components from the evaporated fuel, and thus, only relatively low boiling point components are led into evaporated fuel tank 23. Thus, the purity of the evaporated fuel is increased and at the same time undesired condensation of the evaporated fuel in evaporated fuel tank 23 and fuel piping is suppressed.

A second embodiment of the present invention will be described with reference to FIGS. 9, 10, 11 and 12. Elements identical to those of the first embodiment will be denoted by the same reference numerals and explanation on such elements will be omitted.

As is seen from the drawings, engine 1 has an auxiliary combustion chamber 41 in cylinder head 30 that adjoins a combustion chamber 35 (referred to as a main combustion chamber, supra) of each cylinder. Main combustion chamber 35 and auxiliary combustion chamber 41 are communicated through nozzle holes 42 formed in cylinder head 30. An injection valve 27 that injects a reformed gaseous fuel is connected to auxiliary combustion chamber 41 of each cylinder, so that the reformed gaseous fuel in reformed gaseous fuel tank 25 is supplied to auxiliary combustion chamber 41. Ignition plug 40 is arranged in auxiliary combustion chamber 41.

In the above-mentioned construction, the reformed gaseous fuel injected into auxiliary combustion chamber 41 is ignited by ignition plug 40, and the reformed gaseous fuel thus ignited jets out a column-shaped torch flame into main combustion chamber 35 through nozzle holes 42 thereby to burn air/fuel mixture in main combustion chamber 35.

Figure 11:
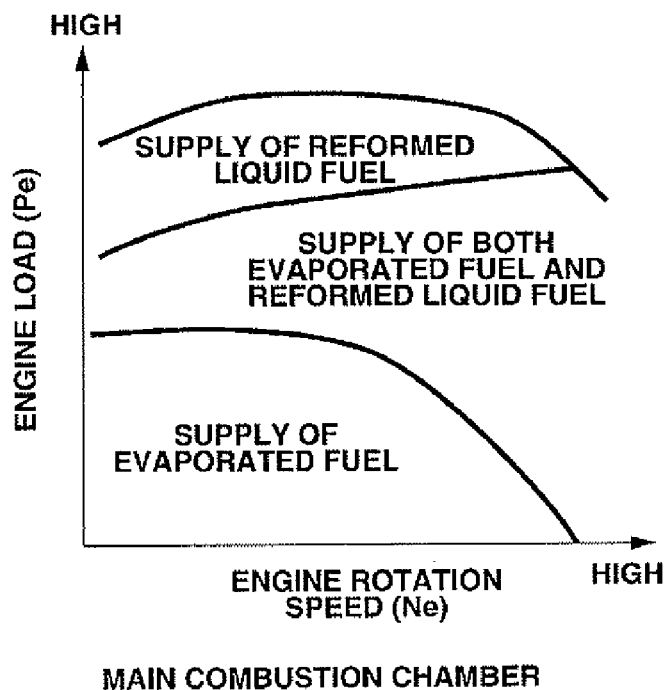
FIG. 11 is a fuel supply control map used for operation of the second embodiment.
Figure 12:
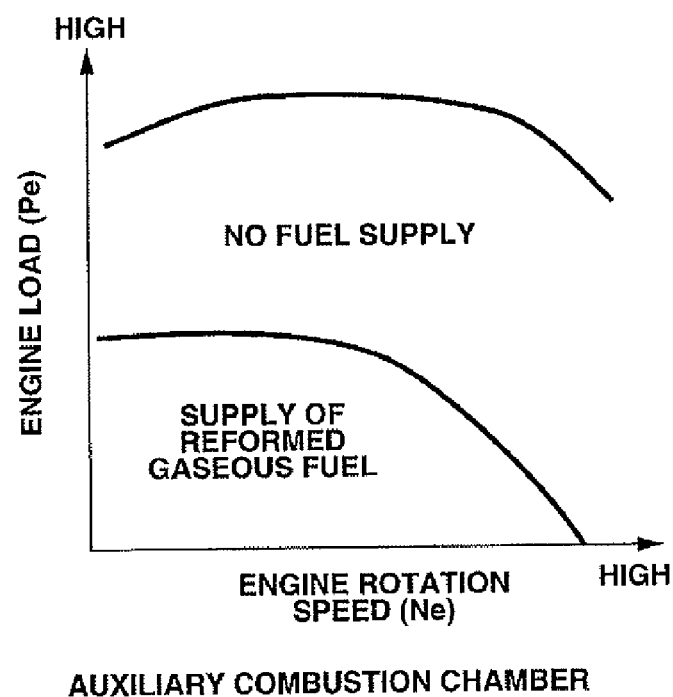
FIG. 12 is another fuel supply control map used for operation of the second embodiment

FIGS. 11 and 12 show fuel supply control maps provided in accordance with an operation condition of the second embodiment.

In the second embodiment, like in the first embodiment, a low octane fuel with a high boiling point is fed to engine 1 after being changed to an evaporated fuel, and thus, even when a fuel having a high boiling point, like light oil or the like, is used, undesirable fuel flow on walls of the intake port and combustion chamber is suppressed or at least minimized. Furthermore, only when the engine is under a low load operation condition, the reformed gaseous fuel is fed to auxiliary combustion chamber 41 to produce jetted flame through nozzle holes 42 the for burning the mixture of the evaporated fuel and air in main combustion chamber 35. Accordingly, the combustion stability of the mixture in combustion chamber 35 under the low load operation condition is much improved as compared with that of the above-mentioned first embodiment. Thus, the lean limit for stable combustion is remarkably expanded and the fuel consumption (viz., enhanced fuel economy) is much improved.

While the invention has been disclosed with reference to certain preferred embodiments, numerous modifications, alterations, and changes to the described embodiments are possible without departing from the sphere and scope of the invention, as defined in the appended claims and equivalents thereof. Accordingly, it is intended that the invention not be limited to the described embodiments, but that it have the full scope defined by the language of the following claims.

The invention claimed is:

1. A power plant comprising:
   an internal combustion engine;
   a fuel conversion device that coverts a fuel to be supplied to the internal combustion engine from a before-conversion fuel to an after-conversion fuel;
   a first fuel supply device that supplies the fuel conversion device with the before-conversion fuel;
   a second fuel supply device that supplies the internal combustion engine with the after-conversion fuel, the after-conversion fuel being the fuel that has been converted by the fuel conversion device; and
   a controller that is communicated with the internal combustion engine, the fuel conversion device, the first fuel supply device and the second fuel supply device;
   wherein the controller is configured to:
   supply the fuel conversion device with the before-conversion fuel by operating the first fuel supply device;
   control the temperature of the fuel conversion device in a first temperature range to evaporate the before-conversion fuel to produce a first after-conversion fuel;
   control the temperature of the fuel conversion device in a second temperature range to reform the before-conversion fuel to produce a second after-conversion fuel; and supply the internal combustion engine with the after-conversion fuel by operating the second fuel supply device.

2. The power plant according to claim 1, wherein the fuel conversion device carries out a heat exchange with waste heat of the internal combustion engine.

3. The power plant according to claim 2, wherein the second temperature range is higher than the first temperature range.

4. The power plant according to claim 3, wherein an amount of the before-conversion fuel supplied to the fuel conversion device per unit time is increased as the amount of the waste heat of the internal combustion engine increases.

5. The power plant according to claim 4, wherein an amount of the before-conversion fuel that is to be reformed per unit time when the temperature of the fuel conversion device is controlled in the second temperature range, is smaller than an amount of the before-conversion fuel that is to be evaporated per unit time when the temperature of the fuel conversion device is controlled in the first temperature range.

6. The power plant according to claim 3, further comprising:
a device that adjusts an amount of air fed to the fuel conversion device,
wherein the controller is configured to vary the amount of air fed to the fuel conversion device per unit time.

7. The power plant according to claim 6, wherein when the temperature of the fuel conversion device is controlled in the second temperature range for reforming the before-conversion fuel, the amount of air fed to the fuel conversion device per unit time is increased as the waste heat of the engine decreases.

8. The power plant according to claim 3, further comprising:
a device that adjusts an amount of gas fed to the fuel conversion device,
wherein when the temperature of the fuel conversion device is controlled in the first temperature range for evaporating the before-conversion fuel, the gas is fed to the fuel conversion device in such a manner that the evaporated fuel thus produced has a lower boiling point.

9. The power plant according to claim 8, wherein the gas is air.

10. The power plant according to claim 8, wherein the gas is an exhaust gas recirculation gas.

11. The power plant according to claim 2, wherein the waste heat of the internal combustion engine is an exhaust heat.

12. The power plant according to claim 2, wherein when the engine is under a low load operation condition, the first after-conversion fuel is fed to the engine.

13. The power plant according to claim 2, wherein when the engine is under a high load operation condition, the second after-conversion fuel is fed to the engine.

14. The power plant according to claim 2, further comprising:
a condenser arranged at a downstream position of the fuel conversion device, the condenser condensing the fuel from the fuel conversion device to separate the fuel into a gaseous fuel having a high volatility and a liquid fuel having a low volatility.

15. The power plant according to claim 14, wherein when the engine is under a low load operation condition, the gaseous fuel separated by the condenser from the fuel produced when the fuel evaporation is carried out by the fuel conversion device is fed to the internal combustion engine.

16. The power plant according to claim 14, wherein the condenser includes upstream and downstream positioned condenser sections that are connected in tandem, and in which the upstream positioned condenser section carries out a liquefaction-separation to produce a fuel having a low volatility, and the downstream positioned condenser section carries out a liquefaction-separation to produce a fuel having a high volatility.

17. The power plant according to claim 16, wherein when the engine is under a low load operation condition, the gaseous fuel separated by the upstream positioned condenser section from the fuel produced when the fuel evaporation is carried out by the fuel conversion device is fed to the internal combustion engine.

18. The power plant according to claim 16, wherein when the engine is under a high load operation condition, the gaseous fuel separated by the downstream positioned condenser section from the fuel produced when the fuel reforming is carried out by the fuel conversion device is fed to the internal combustion engine.

19. The power plant as claimed in claim 16, wherein the internal combustion engine comprises:
a main combustion chamber; and
an auxiliary combustion chamber in communication with the main combustion chamber through nozzle holes, the auxiliary combustion chamber having an ignition plug installed therein,
wherein when the engine is under a low load operation condition, the gaseous fuel separated by the downstream positioned condenser section from the fuel produced when the fuel reforming is carried out by the fuel conversion device is fed to the auxiliary combustion chamber.

20. The power plant according to claim 2, in which the fuel reforming is carried out by a dehydrogen-reforming reaction.

21. The power plant according to claim 2, wherein the fuel reforming is carried out by a partial oxidation reaction.

22. The power plant according to claim 2, wherein the fuel reforming is carried out by an isomerization reaction.

23. The power plant according to claim 2, wherein the second after-conversion fuel has an octane number that is higher than that of the before-conversion fuel supplied to the fuel conversion device and that of the first after-conversion fuel.

24. A method of controlling a power plant, comprising:
exchanging heat between a fuel conversion device and exhaust heat of an internal combustion engine;
supplying a before-conversion fuel to the fuel conversion device;
controlling the temperature of the fuel conversion device in a first temperature range to evaporate the before-conversion fuel to produce a first after-conversion fuel;
controlling the temperature of the fuel conversion device in a second temperature range to reform the before-conversion fuel to produce a second after-conversion fuel; and
supplying the internal combustion engine with the after-conversion fuel.

25. A power plant comprising:
an internal combustion engine;
fuel conversion means for converting a fuel to be supplied to the internal combustion engine from a before-conversion fuel to an after-conversion fuel;
first fuel supply means for supplying the fuel conversion means with the before-conversion fuel;
second fuel supply means for supplying the internal combustion engine with the after-conversion fuel, the after-conversion fuel being the fuel that has been converted by the fuel conversion means; and
means for controlling the power plant, that is communicated with the internal combustion engine, the fuel conversion means, the first fuel supply means and the second fuel supply means;

wherein the means for controlling is configured to:
supply the fuel conversion means with the before-conversion fuel by operating the first fuel supply means;
control the temperature of the fuel conversion means in a first temperature range to evaporate the before-conversion fuel to produce a first after-conversion fuel;
control the temperature of the fuel conversion means in a second temperature range to reform the before-conversion fuel to produce a second after-conversion fuel; and
supply the internal combustion engine with the after-conversion fuel by operating the second fuel supply means.

\* \* \* \* \*